United States Patent
Markiewicz et al.

(10) Patent No.: US 9,507,435 B2
(45) Date of Patent: *Nov. 29, 2016

(54) INLINE HANDWRITING RECOGNITION AND CORRECTION

(75) Inventors: Jan-Kristian Markiewicz, Redmond, WA (US); Adrian James Garside, Sammamish, WA (US); Takanobu Murayama, Seattle, WA (US); Krishna Kotipali, Issaquah, WA (US); Susan E. Dziadosz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 610 days.

This patent is subject to a terminal disclaimer.

(21) Appl. No.: 13/351,676

(22) Filed: Jan. 17, 2012

(65) Prior Publication Data

US 2012/0121181 A1 May 17, 2012

Related U.S. Application Data

(63) Continuation of application No. 11/962,438, filed on Dec. 21, 2007, now Pat. No. 8,116,569.

(51) Int. Cl.
| | |
|---|---|
| *G06K 9/18* | (2006.01) |
| *G06F 3/023* | (2006.01) |
| *G06F 3/0481* | (2013.01) |
| *G06F 3/0488* | (2013.01) |
| *G06K 9/00* | (2006.01) |

(52) U.S. Cl.
CPC ........... *G06F 3/0237* (2013.01); *G06F 3/0481* (2013.01); *G06F 3/04883* (2013.01); *G06K 9/00436* (2013.01); *G06F 2203/04806* (2013.01)

(58) Field of Classification Search
CPC ............... G06F 3/03545; G06F 3/044; G06F 3/04883; G06F 17/24; G06F 17/242; G06K 9/222
USPC .......................................................... 382/186
See application file for complete search history.

(56) References Cited

U.S. PATENT DOCUMENTS

| | | | | |
|---|---|---|---|---|
| 5,682,439 | A | * 10/1997 | Beernink et al. | 382/187 |
| 6,021,218 | A | * 2/2000 | Capps | G06K 9/222 382/187 |
| 8,116,569 | B2 | * 2/2012 | Markiewicz | G06F 3/0237 345/179 |
| 2007/0260981 | A1 | * 11/2007 | Kim et al. | 715/531 |

* cited by examiner

*Primary Examiner* — Edward Park
*Assistant Examiner* — Michael Vanchy, Jr.
(74) *Attorney, Agent, or Firm* — Aaron Chatterjee; Dan Choi; Micky Minhas

(57) ABSTRACT

As a user writes using a handheld writing device, such as an electronic pen or stylus, handwriting input is received and initially displayed as digital ink. The display of the digital ink is converted to recognized text inline with additional digital ink as the user continues to write. A user may edit a word of recognized text inline with other text by selecting the word. An enlarged version of the word is displayed in a character correction user interface that allows a user to make corrections on an individual character basis and also provides other correction options for the word.

19 Claims, 15 Drawing Sheets

INLINE HANDWRITING RECOGNITION AND CORRECTION

CROSS-REFERENCE TO RELATED APPLICATIONS

This application is a continuation of U.S. patent application Ser. No. 11/962,438, filed Dec. 21, 2007, which is herein incorporated by reference in its entirety.

BACKGROUND

Typical computer systems, especially computer systems using graphical user interface (GUI) systems, are optimized for accepting user input from one or more discrete input devices. Common input devices include a keyboard for entering text and a pointing device, such as a mouse with one or more buttons, for controlling the user interface. The keyboard and mouse interface facilitates user interaction with computer systems such as for the creation and modification of electronic documents including text, spreadsheets, database fields, drawings, and photos.

One of the limitations with conventional GUI systems is that a user must generally type the text they are entering into the computer system using the keyboard. More recently, however, pen-based computing systems, such as tablet PCs and the like, have been increasing in popularity. In pen-based computing systems, user input advantageously may be introduced using an electronic "pen" or stylus. More particularly, a user can write with the stylus on the screen of the electronic tablet or other appropriate surface in a similar manner to traditional pen and paper. The strokes of the user's handwriting with the stylus are read and used to recreate the handwriting in electronic form on the screen with "digital ink."

As pen-based computing systems are becoming more popular, users are increasingly entering more data in the form of digital ink. In many instances, users may wish to convert the original digital ink data to machine-generated text, i.e., text suitable for use and manipulation by conventional word processing programs and other application programs. While handwriting recognition technology for converting handwritten digital ink to machine-generated text has improved in recent years, recognizers of this type still are error prone, particularly for users with poor handwriting, users that write at an angle, and/or users that write very quickly. As a result, machine-generated text produced by a recognizer, at times, needs to be corrected and/or otherwise changed or edited by the user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing inline handwriting recognition and correction. When a user writes using a handheld writing device, such as an electronic pen or stylus, the handwriting input is initially displayed as digital ink. The handwriting input is also analyzed using a recognizer to identify one or more words of text for the digital ink. As the user continues to write, the display of the handwriting input may be converted to the text from the recognizer. The text replaces the digital ink such that the text is inline with further digital ink provided as the user continues to write. Additionally, a user may correct a word of text converted from digital ink by selecting the word. Based on the selection, the word is presented in a correction user interface inline with the other text. The correction user interface provides an enlarged view of the word in place of an original view of the word and allows editing of the word on an individual character basis, as well as providing additional correction options for the word. When the word is displayed in the correction user interface, the display of the other words of text may be adjusted to provide space for displaying the correction user interface inline with the other words.

BRIEF DESCRIPTION OF THE DRAWINGS

The present invention is described in detail below with reference to the attached drawing figures, wherein.

DETAILED DESCRIPTION

Figure 1:
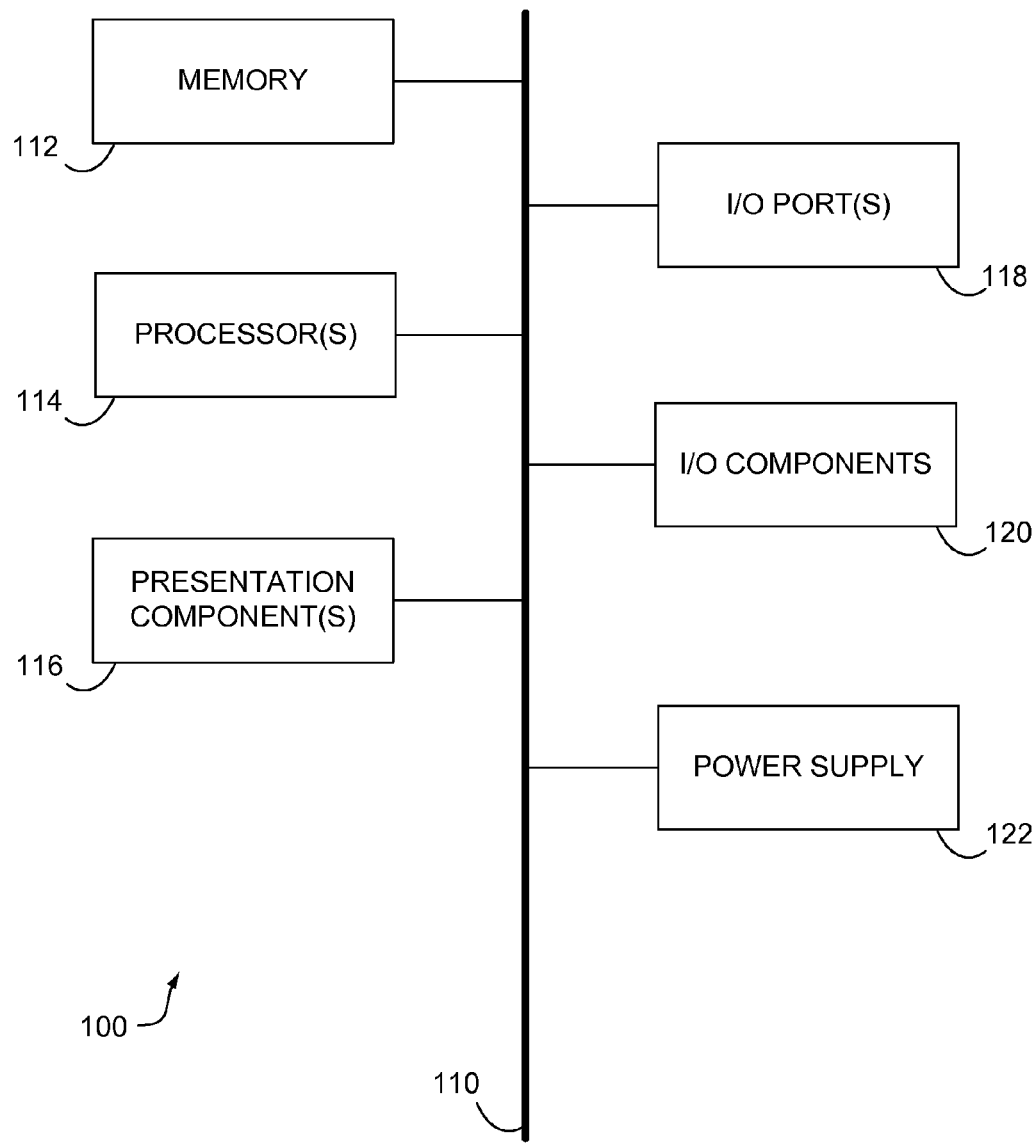
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

As noted previously, although handwriting recognition technology has improved over recent years, handwriting recognition is not perfectly accurate and may be prone to errors in recognition for a variety of reasons, such as poor handwriting, users writing at an angle, and/or users writing very quickly. Accordingly, users will continue to need to be able to make corrections to text recognized from the users' handwriting. Embodiments of the present invention provide an efficient inline handwriting recognition and correction user experience. The approach speeds up the text input and correction process and makes it feel less tedious for the user.

In accordance with embodiments of the present invention, as a user writes using a handheld writing device such as an electronic pen or stylus, digital ink is initially displayed, and the digital ink is converted to text directly within the writing area as the user continues to write. In some embodiments, the system attempts to convert digital ink to text each time a user finishes writing a word and/or begins writing a new word. This provides the user with a visual indication of the conversion that is occurring and also makes it possible for the user to append more digital ink at the correct location even if the ink is converted to text too early (e.g., in the middle of a word). Although digital ink is no longer displayed after it has been converted to text, in some embodiments, the digital ink may be saved in the background and used for recognition purposes as the user continues to write.

In some embodiments, the user may also add handwriting between or before words of recognized text. In particular, the user may begin to write in the space between two words of recognized text or before a first word of recognized text, and the space continues to grow as the user writes to provide room for the user's handwriting. As the user continues to write, the digital ink is converted to text. When the user finishes writing, the space shrinks back down to a default space size between words.

Embodiments of the invention also provide for inline correction, which enables a user to correct handwriting recognition errors directly in the writing area. When a user selects a word of recognized text, the word is presented using a correction user interface. In particular, an enlarged view of the word is provided by "zooming in" on the word. The correction user interface allows the user to make corrections to the word on an individual character basis and may also present additional options for correcting the word. To provide space for the enlarged view of a selected word inline with other words of text, the display of the other words may be adjusted, for instance, by resizing and/or moving the other words.

Accordingly, in one aspect, an embodiment of the present invention is directed to one or more computer-storage media embodying computer-useable instructions for performing a method. The method includes receiving input corresponding with user handwriting from a handheld writing device and displaying digital ink representing the user handwriting based on the input. The method also includes analyzing the input using a recognizer to identify one or more words as recognition text for the digital ink. The method further includes employing at least three triggers to determine when to convert display of the digital ink to display of the recognition text. The three triggers include a distance-based trigger, a recognition-based trigger, and an overall timer-based trigger. The method still further includes determining that at least one of the triggers has been satisfied indicating to convert display of the digital ink to the recognition text, and displaying the recognition text in place of the digital ink.

In another aspect, an embodiment of the present invention relates to one or more computer-storage media embodying computer-useable instructions for performing a method. The method includes displaying text including two or more words, wherein the text was previously converted from digital ink corresponding with handwriting input. The method also includes receiving a user selection of a word within the text. The method further includes responsive to the user selection, displaying the word in a correction user interface allowing correction of the word on an individual character basis. The correction user interface provides an enlarged display of the word in place of an original display of the word in a manner in which the enlarged display of the word is inline with other words within the text. The method still further includes adjusting the display of the other words within the text to provide space for displaying the correction user interface including the enlarged display of the word.

In a further aspect of the invention, an embodiment is directed to one or more computer-storage media embodying computer-useable instructions for performing a method. The method includes receiving handwriting input corresponding with a handheld writing device being moved relative to a display surface and displaying digital ink at a location on a display corresponding with a location of the display surface at which the handwriting input is received. The method also includes analyzing the handwriting input using a recognizer to identify one or more words of text corresponding with the handwriting input. The method further includes replacing display of the digital ink with the text as the user continues to provide additional handwriting input using the handheld writing device, wherein the text is displayed inline with additional digital ink corresponding with the additional handwriting input. The method also includes receiving input to present a word of the text in a character correction interface. The character correction interface provides an enlarged display of the word in place of an original display of the word to facilitate receiving further handwriting input to correct the word. The character correction interface also allows correction of the word on an individual character basis. The method further includes displaying the word in the character correction interface by replacing the original display of the word with the enlarged display of the word. The method still further includes adjusting display of other words within the text to provide space for the enlarged display of the word.

Exemplary Operating Environment

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld writing device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, or a mouse. A pen digitizer and an accompanying pen or stylus may be provided in order to digitally capture freehand input (e.g. electronic ink). The pen digitizer may be connected to a serial port interface, directly to the processor 114, or it may be coupled to the processor 114 in any suitable manner, such as via a parallel port or another interface and the system bus 110 as is known in the art. Furthermore, the usable input area of the digitizer may be integrated in a monitor or similar presentation component 116, or it may exist as a separate device overlaying or otherwise appended to a monitor or similar presentation component 116. Using a handheld writing device, such as a stylus, a user can select, highlight, and write on a digitizing display area. Examples of suitable digitizing display panels include electromagnetic pen digitizers and optical digitizers. Other types of pen digitizers may also be used. The digitizer, in connection with the computing system interprets gestures made using the stylus in order to manipulate data, enter text, and execute conventional computer application tasks, such as creating, editing, and modifying spreadsheets, word processing programs, and the like.

The stylus may be equipped with buttons or other features to augment its capabilities. In one example, a stylus could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used as a handheld writing device in the system of FIG. 1. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). As still further examples, systems may use ".NET" or DCOM (distributed component object model) as additional implementations of the ink platform. Yet further implementations may be used including the Win32 programming model and the .Net programming model form Microsoft Corporation. These platforms are commercially available and known in the art.

In addition to use with full performance pen-based computing systems or "tablet PCs" (e.g. convertible laptops or "slate" type tablet PCs), aspects of this invention can be used in conjunction with other types of pen-based computing systems and/or other devices that accept and/or display data as digital ink and/or accept and/or display electronic pen or stylus input, such as: hand-held or palm-top computing systems; personal digital assistants; pocket personal computers; mobile and cellular telephones, pagers, and other communications devices; watches; appliances; and any other devices or systems that include a monitor or other display device and/or digitizer that presents printed or graphical information to users and/or allows input using an electronic pen or stylus.

The computing device 100 may also include or be coupled to a digital ink processing software module. The ink processing module is operable for receiving data from the digitizer and/or the stylus and rendering that data as digital ink (or "wet ink"). Wet digital ink comprises ink that has not been sent to a recognizer to be converted to text. In contrast, "dry ink" comprises digital ink that has been converted to text by a recognizer.

In one exemplary embodiment, the ink processing module comprises a collection of software modules that perform different tasks for recognizing handwriting strokes as digital ink. For example, a stylus and ink module may be provided to receive data describing the positions and angles of the stylus for a series of handwriting strokes. The stylus and ink module interprets the data for recognizing digital ink. Other software modules, such as a recognizer identify certain handwriting strokes and assign them a particular significance. For example, the recognizer converts digital ink to text. In an embodiment, the recognizer breaks the user's handwriting in digital ink down into separate word blocks, evaluates the word blocks, and then upon recognizing a word contained in each word block, converts the digital to word-based text (i.e. text that is typically viewed on a computer monitor or other display device). Additionally, certain gestures (such as a cross-out) may be recognized and associated with other editing processes. The ink processing module can also include an erasing functions module for removing digital ink that has been previously rendered. Those skilled in the art will recognize that the computing device 100 may include or be coupled to other software modules for digital ink processing.

Inline Handwriting Recognition and Correction

As will be described in further detail below, operation of embodiments of the present invention may be considered to occur within two modes: word-mode and character-mode. Word-mode is mainly used to write new words. A user may write words in a variety of different locations, including, for instance, after the rightmost text, between text words, or before the first text word. As the user writes, digital ink is recognized and the display of the digital ink is converted to text from the recognizer. From word-mode, the user can drill down to character-mode to display a correction user interface for a single word. Character-mode allows the user to make corrections to the word inline with other words of recognized text.

Word-Mode

Figure 2A:
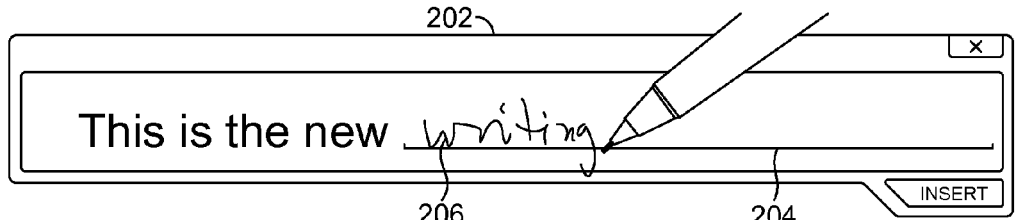
FIGS. 2A-2C are screen displays illustrating conversion of digital ink to recognized text in accordance with an embodiment of the present invention.
Figure 2B:
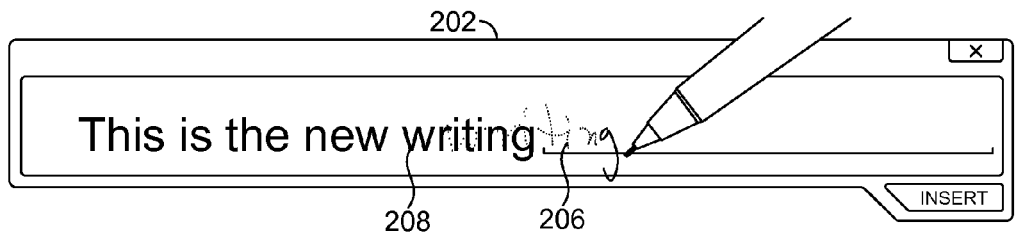
Figure 2C:
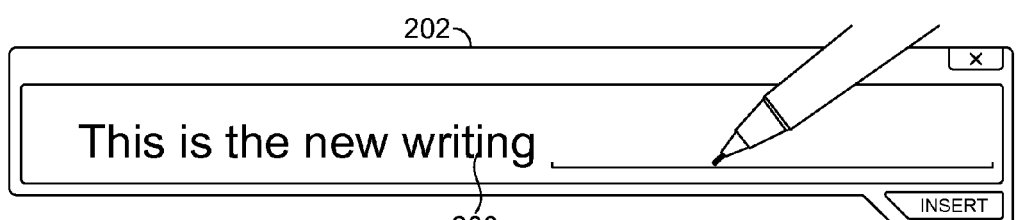

In word-mode, digital ink is recognized using a recognizer as the user is writing, and the digital ink is converted to text directly in the writing area. In an embodiment, the conversion from displayed digital ink to recognized text is performed in a manner such that a word of digital ink is converted to recognized text as the user finishes writing the word and/or starts writing the next word. FIGS. 2A-2C provide screenshots illustrating the conversion of digital ink to recognized text in accordance with an embodiment of the present invention.

Referring initially to FIG. 2A, a user is writing in a writing area 202. A portion of the writing ("This is the new") has already been converted to recognized text, and the user is currently writing the word "writing" within the writing area 202. As shown in FIG. 2A, in an embodiment, a line 204 is provided within the writing area 202 indicating to the user where the user can write, and the line is removed as digital ink is converted to recognized text. As the user is writing, digital ink 206 (i.e., "writing") is displayed within the writing area. The digital ink 206 may be collected and stored in any suitable manner and using any suitable format known in the art. The digital ink 206 is also sent to a recognizer, which attempts to recognize text that corresponds with the digital ink 206.

Based on a number of triggers within various embodiments of the invention as will be discussed in further detail below, as the user is writing, a determination is made to convert the displayed digital ink 206 within the writing area 202 to recognized text. As shown in FIG. 2B, in an embodiment, the conversion begins by displaying the recognized text ("writing") 208 within the writing area 202. In an embodiment, the digital ink 206 is initially displayed with the recognized text 208 but begins to gradually fade away and disappears after a configurable time interval (e.g., after 1000 ms). FIG. 2C illustrates the writing area 202 after the conversion from digital ink 206 to recognized text 208 has completed. As shown in FIG. 2C, only the recognized text 208 is presented within the writing area, and the digital ink 206 has been removed.

When digital ink is converted to recognized text, the text showing the recognized handwriting is divided into separate word boxes for each word. For instance, with reference to FIG. 2C, a word box corresponds with each word in the recognized text, including: "This," "is," "the," "new," and "writing." In an embodiment, when the digital ink is converted into word boxes, the system avoids displaying a word box (e.g., the recognized text) under the user's current pen location as the user is continuing to write such that the user is not distracted by writing over text. For instance, with reference to FIG. 2B, if the word box for the recognized text "writing" 208 exceeded the digital ink 206 corresponding with the word box, the user would be distracted by the recognized text as the user continues to write.

To avoid this to the extent possible, the size of word boxes may be determined such that the rightmost word box does not exceed the rightmost digital ink stroke. By way of example only and not limitation, in one embodiment, this may be determined by first drawing the current recognized text with the currently used font size for the other word boxes (or using a default font size, e.g., if this is the first word box). The width of the new text box for this text is measured and compared against an available word box space. The available word box space is defined as the distance between the rightmost word box (or the left edge of the writing surface if no word box is displayed yet) and the rightmost ink stroke. If the available word box space is greater than or equal to the newly created word box width, then the new word box is inserted without modification. On the other hand, if the new word box is wider than the available word box space, the new word box and/or other word boxes may be scaled such that the new word box does not exceed the available word box space. For instance, in an embodiment, all the word boxes to the left and the new word box are scaled down so that they will align with the rightmost ink stroke. If there are any word boxes to the right (e.g., when the user is inserting a word between two words of recognized text) then those word boxes may also be updated to use the reduced font size. This will keep the font size for all the text boxes on this line consistent, and thus more readable. In an embodiment, a minimum font size is defined to ensure that word boxes are not reduced to such a small size that they are not readable. In the edge case where this minimum font size is reached, the word boxes might appear under the user's pen location. Additionally, in an embodiment, a default size may be used to define the word space between each word box (e.g., 25% of the height of the writing surface). This word space can also shrink with the size reduction of the word boxes, but may be kept consistent for all the word spaces to ensure readability.

As noted previously, the display of digital ink is converted to text inline as the user continues to write. In some embodiments, the system attempts to convert each digital ink word to recognized text after the user completes writing the word and/or begins to write the next word. A number of triggers may be employed for determining when to convert the display of digital ink to text within the scope of embodiments of the invention. In one embodiment, a combination of three triggers is employed for determining when to convert digital ink to text. The three triggers include: a distance-based trigger; a recognition-based trigger; and an overall timer-based trigger. Conversion of digital ink to recognized text within a writing area occurs whenever any of these triggers has been satisfied.

The distance-based trigger converts digital ink to recognized text if the user moves the pen a certain distance from the left-most or right-most ink strokes. In an embodiment, the distance-based trigger includes two distance triggers. The first distance trigger is a short-distance trigger that includes a time-out to avoid mistaken conversions if the pen just passes the short-distance slightly. The second distance trigger is a long-distance trigger that converts digital ink to recognized text when the long-distance is passed.

Figure 3:
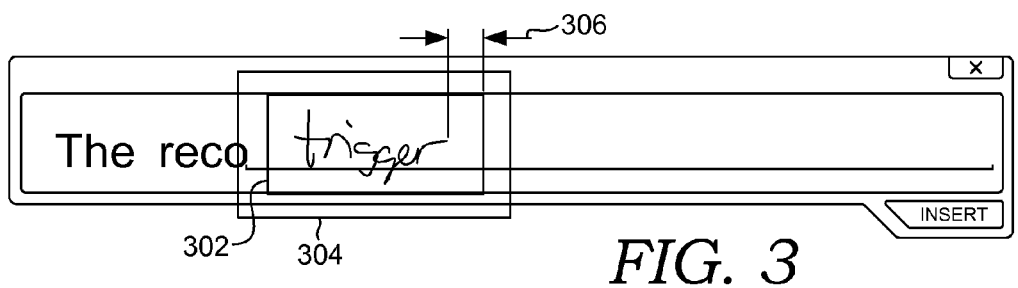
FIG. 3 is a screen displaying illustrating distance triggers for word recognition in accordance with an embodiment of the present invention.

The two trigger distances are illustrated in FIG. 3 as two rectangle boundaries 302 and 304. The smaller boundary 302 corresponds with the short-distance trigger. The width of the smaller boundary 302 is calculated based on a "trigger distance" 306. The trigger distance 306 is defined as a configurable distance to the right of the user's rightmost ink stroke (e.g., X number of pixels to the right of the user's rightmost ink stroke). Accordingly, the width of the smaller boundary 306 starts one trigger distance to the left of the leftmost ink stroke and ends one trigger distance to the right of the rightmost ink stroke. The height of the smaller boundary 302 may vary, but in an embodiment, the height of the smaller boundary 302 corresponds with the height of the writing surface.

In an embodiment, a default value may be used to define the trigger distance. For instance, a default trigger distance of 25 pixels may be employed. In another embodiment, the trigger distance automatically adapts to fit the user's writing style by determining an average word space (i.e., spacing between words) for the user and setting the trigger distance to the user's average word space. In particular, the word space distances from the user's digital ink (e.g., every time "wet" ink is discarded as will be described in further detail below) will be measured and sent to a trigger distance resizing algorithm. The algorithm will recalculate the user's average word space size, and the new value will be used to update the trigger distance. This automatic adjustment facilitates avoiding the trigger distance from being too aggressive (e.g., conversion to text is performed in the middle of a word) or too passive (e.g., conversion to text is not performed after each word is written). In an embodiment, a minimum trigger distance may be employed such that the trigger distance may never be lower than the minimum regardless of the user's average word space. Additionally, in embodiments, each user may have an associated trigger distance. In a further embodiment, the length of the time-out associated with the short-distance trigger may be adapted to fit the user's handwriting style by analyzing the typical time between writing words for the user.

The larger boundary 304 corresponds with the long-distance trigger. In an embodiment, the larger boundary 304 is a preconfigured size independent of the smaller boundary 302. In another embodiment, the size of the larger boundary 304 is based on the size of the smaller boundary 302. For instance, the larger boundary 304 may be a predetermined number of pixels bigger than the smaller boundary 302.

When the user lifts the pen and passes the larger boundary 304, all digital ink is converted to text. In an embodiment, if the pen only passes the smaller boundary 302, but stays within the larger boundary 304, a timer is started. If the user's pen stays in this region until the timer has passed a predetermined "crossing time" (e.g., 500 ms), the current digital ink on the writing surface is converted to text. If the user's pen moves back into the smallest rectangle boundary again, then the crossing-timer is reset. This crossing time is intended to prevent accidental conversions. On a device that doesn't support hover, the conversion may be triggered when the user starts inking outside of the smallest rectangle boundary.

The recognition-based conversion employs the recognition results from a recognizer in an attempt to determine whether the user has finished writing a word and to convert the display of digital ink to recognized text. The recognition-based conversion may be time-based. In particular, if a word doesn't change in the recognition results within a set time period (e.g., 500 ms), then a word box gets created for that word and the corresponding ink is converted to the recognized text. Recognition-based conversion may be useful, for instance, if a distance trigger is too big. In particular, as a user is writing, the user's spacing between words may not exceed the distance-based triggers. However, the recognition results may indicate that a user has finished writing a word triggering the conversion of digital ink to recognized text.

The third conversion mechanism used in an embodiment of the present invention is an overall timer. This timer starts when the user lifts the pen, and is reset every time inking resumes. A predetermined overall time may be established for conversion purposes (e.g., 1500 ms). When the timer reaches the predetermined overall time, all digital ink is converted to recognized text.

In an embodiment, digital ink that is removed from display within the writing surface when conversion occurs is saved in the background for recognition purposes. This makes it possible to append ink to a word that is converting or has been converted to recognized text. The digital ink that is no longer displayed or being removed but is saved in the background (referred to herein as "wet ink") remains where the user wrote the digital ink so that additional digital ink written by the user is received in relation to the original ink location. For instance, if digital ink is converted to recognized text too early (e.g., in the middle of a word), as the user continues to write, the saved digital ink may be used with the new digital ink the user writes for recognition purposes. This allows the recognized text that was originally displayed to be changed based on further recognition.

Figure 4A:
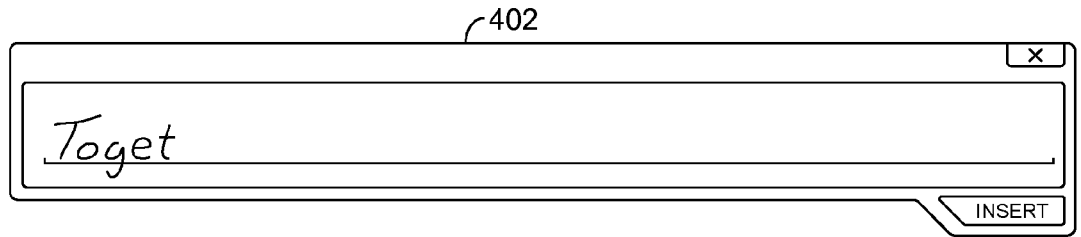
FIGS. 4A-4C are screen displays illustrating the use of saved digital ink to correct text recognition in accordance with an embodiment of the present invention.
Figure 4B:
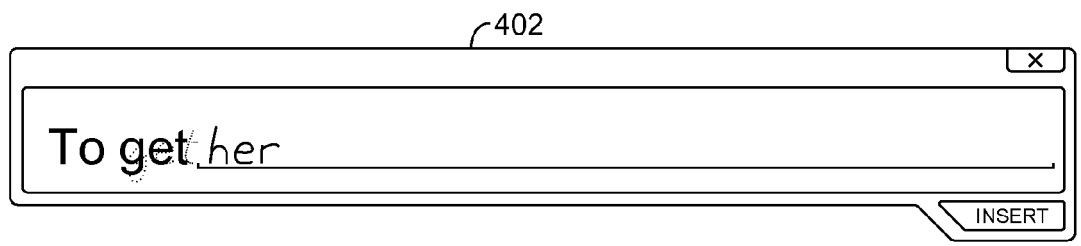
Figure 4C:
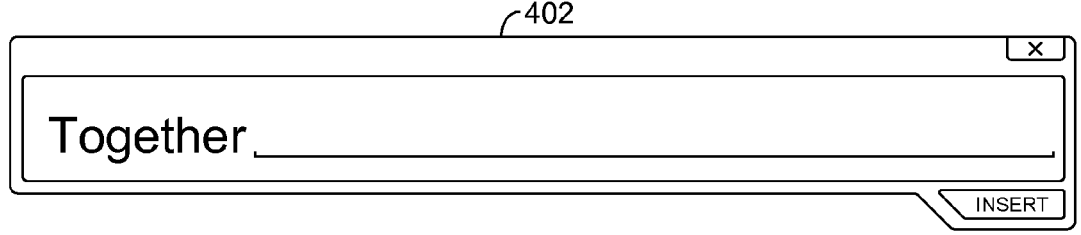

By way of example with reference to FIGS. 4A-4C, suppose that a user intends to write the word "together." As shown, in FIG. 4A, the user begins writing the word "together" in the writing surface 402. In the present example, after the user has written the "toget" portion of the word "together," the recognizer initially recognizes the "to" and "get" portions of the digital ink as separate words and converts the digital ink to recognized text, as shown in FIG. 4B. However, the system saves the digital ink in the background. As the user continues to write the "her" portion of "together," as shown in FIG. 4B, the recognizer uses the new digital ink ("her") as well as the saved digital ink ("toget") to determine that the user intended to write the word "together." Accordingly, as shown in FIG. 4C, instead of displaying "to," "get," and "her" as separate words, the word "together" is displayed as a single word.

It may not be desirable to indefinitely save wet ink in the background and use the wet ink for recognition purposes as this may cause the displayed recognition results to frequently change as the user continues to writes, which may be distracting to the user. Accordingly, in some embodiments of the present invention, the system continues to save wet ink in the background and use the wet ink for recognition purposes only until a particular condition occurs. When such a condition occurs, the wet ink may be discarded and/or removed from being actively considered for recognition purposes. This may help avoid changing displayed recognition text too often. In various embodiments of the invention, wet ink is discarded and/or no longer used for recognition purposes according to one or more of the following conditions.

The user goes into character-mode (as will be described in further detail below) for any of the recognized words.

The user starts to write between any of the recognized words.

The writing surface gets cleared and/or closed.

The user starts writing a predetermined distance to the left of the right-most ink-stroke. This prevents garbled wet ink that would result from the saved ink being used in conjunction with the new wet ink that is written on top of the saved wet ink.

The recognition results have been stabilized for a predetermined period of time.

The wet ink is more than a predetermined number of words back. In other words, a buffer zone comprising a predetermined number of words may be employed. In an embodiment a buffer zone of three words is employed. Any words outside of the buffer zone (e.g., more than the predetermined number of words back) are fixed, and the corresponding digital ink is discarded and/or no longer actively used for recognition purposes.

Figure 5A:
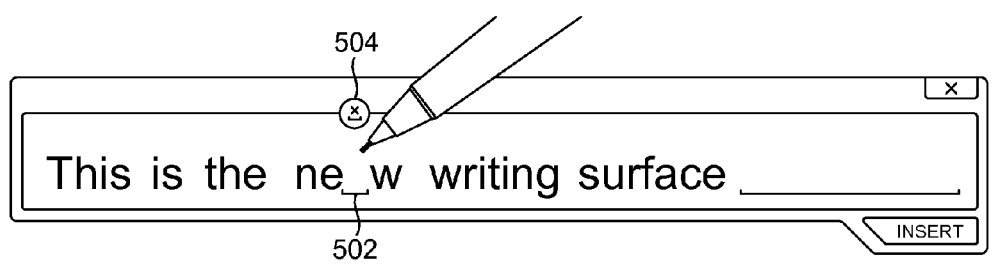
FIGS. 5A and 5B are screen displays illustrating deletion of a space while in word-mode in accordance with an embodiment of the present invention.
Figure 5B:
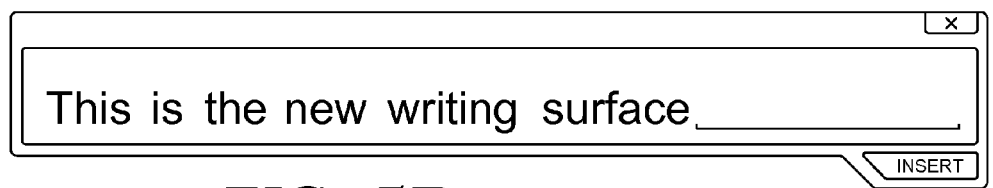

In word-mode, a user may perform a number of actions to make corrections to recognized text. For instance, in one embodiment, as shown in FIG. 5A, machines with pen digitizers that support hover will display a baseline 502 and a "delete-space" button 504 when the pen hovers over a space (on touch machines without hover support, the user may need to go into character-mode to delete spaces, as explained in further detail below). In an embodiment, the button 504 may be centered horizontally over the space, and center-aligned vertically about the top edge of the writing surface. Tapping the button 504 deletes the corresponding space and causes the words on each side of the space to be combined as illustrated in FIG. 5B. In the present example, after the user has tapped the button 504, the space between "ne" and "w" is deleted to form the combined word "new."

A user may also insert handwriting (which is converted to text) between words of recognized text while in word-mode. To insert text between words (or before the first word on the line), the user can simply start writing in the space where the user wants to insert text. On pen down, the writing baseline is displayed, the space grows a predetermined amount from the space size (e.g., an additional 30 pixels), and the new digital ink is displayed on the writing surface. In another embodiment, if the user taps once in the space, instead of starting to write, the baseline is displayed, the space grows a predetermined amount from the space size, but no digital ink is displayed on the writing surface. On the next pen down, digital ink is displayed on the writing surface.

To make sure that the user can fit whatever they want to write between the words, the baseline will continue to grow automatically each time digital ink is added. This growing moves the words on the right-hand side of the baseline further to the right. In an embodiment, when the rightmost word won't fit on the line it may be moved to the next line. In some embodiments, scroll button(s) may be displayed on the right edge of the writing surface to allow a user to scroll between multiple lines. In further embodiments, recognized text may be resized to allow the text to fit within a space available within the writing surface. For instance, the font of all text may be reduced to provide space for the user's handwriting.

Figure 6A:
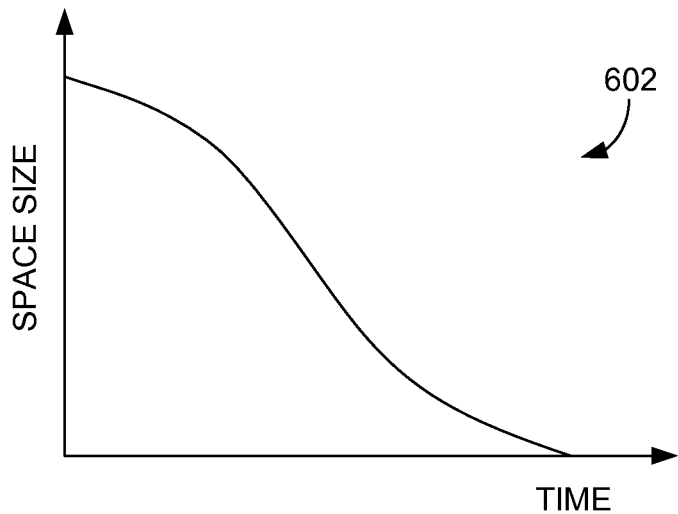
FIGS. 6A and 6B are graphs showing word spacing size and word spacing shrink speed, respectively, versus time in accordance with an embodiment of the present invention.
Figure 6B:
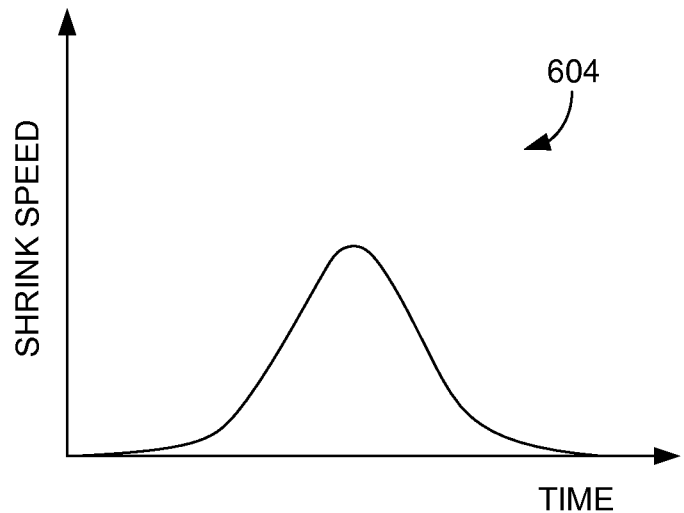

When a user is writing on the baseline between or before words of recognized text, the digital ink to recognized text conversion may happen similar to the conversion explained previously. Additionally, after the digital ink has been converted to recognized text, a shrink-timer (e.g., of 1000 ms) is started. The shrink-timer is stopped and reset if new ink is added in the current space of the writing surface. However, if the shrink-timer passes, the baseline starts to shrink to the default space size, and the text to the right of the space follows it. In an embodiment, the shrinking speed is slow to begin with (e.g., to not stress the user if he/she wants to write in the space but waited a little too long), and accelerates until the size of the space approaches the word space size. Toward the end, the shrinking will slow down and come to a smooth stop as the space has been restored to the default word space size. FIGS. 6A and 6B provide graphs illustrating how the shrinking progresses over time. The first graph 602 in FIG. 6A shows that the space width is initially reduced slowly, then the space is reduced quicker as time passes, and finally the space is reduced slowly again as the space approaches the default space size. The second graph 604 in FIG. 6B illustrates the shrink speed over time.

Figure 7A:
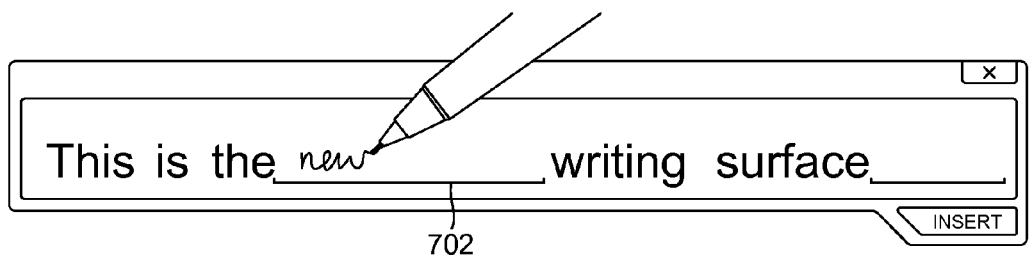
FIGS. 7A-7C are screen displays illustrating the addition of handwriting between recognition text in accordance with an embodiment of the present invention.
Figure 7B:
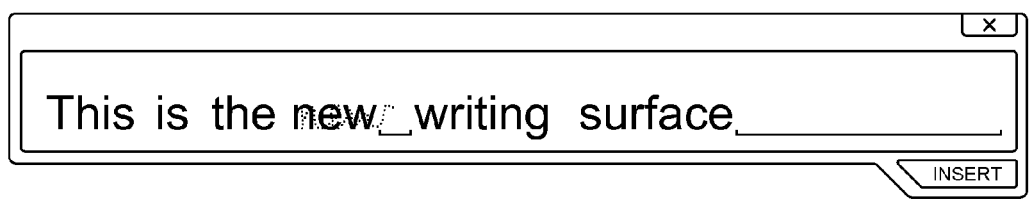
Figure 7C:
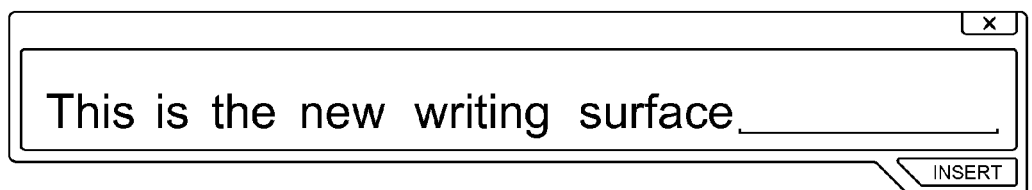

The addition of handwriting between words of recognized text is illustrated in FIG. 7A through FIG. 7C. Initially, as shown in FIG. 7A, a user begins writing the word "new" between the words "the" and "writing." A base line 702 is displayed indicating to the user where the use can insert ink. Additionally, the space between the words automatically continues to grow as the user writes to ensure that the user can fit the writing in the space. As the space grows, the words to the right of the space (i.e., "writing" and "surface") are moved to the right. As shown in FIG. 7B, the digital ink is recognized and converted to recognition text. When the user has stopped writing and the shrink timer has passed, the space begins to shrink back to the default word space size with the words to the right (i.e., "writing" and "surface") following. As shown in FIG. 7C, when the space has shrunk back to the default word space size, the baseline in that space disappears.

In an embodiment, a heuristic may be used to prevent a space from auto-growing when the user wants to perform a gesture (e.g., a left-to-right scratch-out) that starts in a space. The space will not start to auto-grow until the heuristic has determined that the user is writing a word as opposed to performing a gesture. Once this has been determined, the new digital ink is treated as a word. In one embodiment, the heuristic analyzes the number of pen-packets over a stroke distance to provide an indication of how fast the user is moving the pen. The determination of whether the user is writing a word or performing a gesture may then be determined based at least in part on the pen speed.

Figure 8:
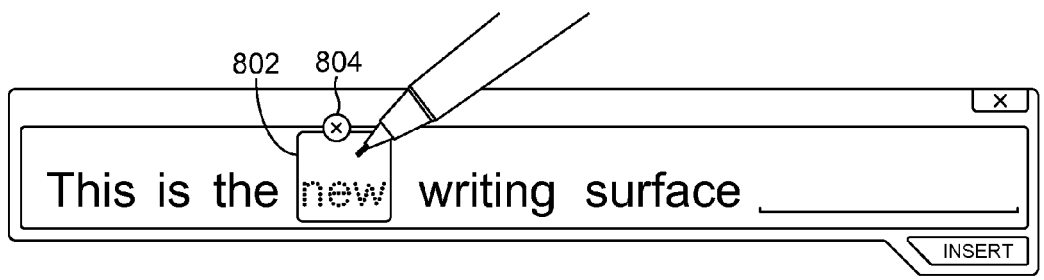
FIG. 8 is a screen display illustrating a user hovering a pen over a word of text in accordance with an embodiment of the present invention.

If the writing surface is being used with a digitizer that supports hover, when the pen is hovered over a word box, in one embodiment, a visual treatment may be provided to give an impression that the word box is button-like and can be tapped. For instance, as shown in FIG. 8, when the pen is hovered over the word box for the word "new," a word box border 802 is provided and the text color for the word "new" is changed. Additionally, a clear button 804 is displayed over the word box. If the user selects the clear button 804, the corresponding word is removed. In one embodiment, a baseline the size of the word box will appear in the space remaining after the word is removed (e.g., in the event the user would like to insert handwriting at that location). After a shrink-timer has passed, the space will start to shrink as described above. If the user clears the last word on a line, the word will be deleted and the baseline will simply extend from the word box to the left of the deleted word to the end of the writing surface. The user can also clear one or more words of recognized text by using a scratch-out gesture. Additionally, in some embodiments, performing a scratch-out gesture on digital ink before it is converted will delete the digital ink.

Figure 9:
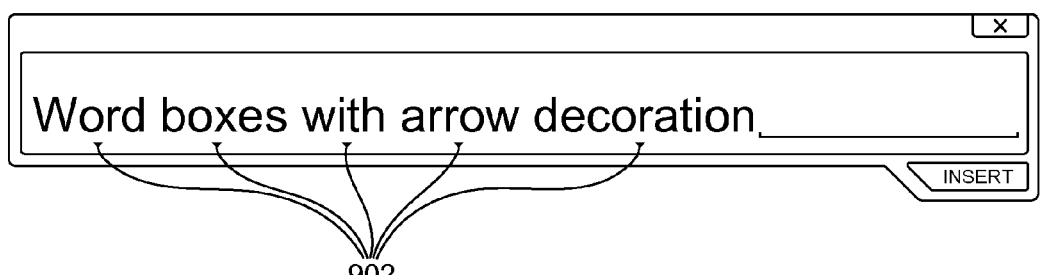
FIG. 9 is a screen display illustrating drop-down arrow provided under each word box to indicate that each word may be selected in accordance with an embodiment of the present invention.

In one embodiment, tapping on a word box will expand the word and show it in character-mode (as will be described in further detail below). As noted above, in some embodiments such as that shown in FIG. 8, a word box may be distinguished visually when a user hovers a pen over the word box, indicating to the user that the word box may be selected. Additionally or alternatively, the word boxes may have a visual treatment without the use of hover, such that the word boxes are distinguishable and to indicate to a user that they can be selected. By way of example only and not limitation, in an embodiment as shown in FIG. 9, a drop-down arrow 902 may be provided under each word box to indicate that each word may be selected.

Character-Mode

Character-mode is used to make corrections to a recognized word inline with other recognized text. As previously noted, in one embodiment, to get into character-mode for a word, the user may tap on the word or otherwise select the word when it is displayed in word-mode. When a user selects a word to enter character-mode, the word is displayed in a character-mode or correction user interface that allows a user to edit the word on an individual character basis. Also, a number of additional features may be presented to facilitate editing the selected word. When a word is selected, the word is "zoomed in" by enlarging the display of the word to facilitate corrections to the selected word.

Figure 10:
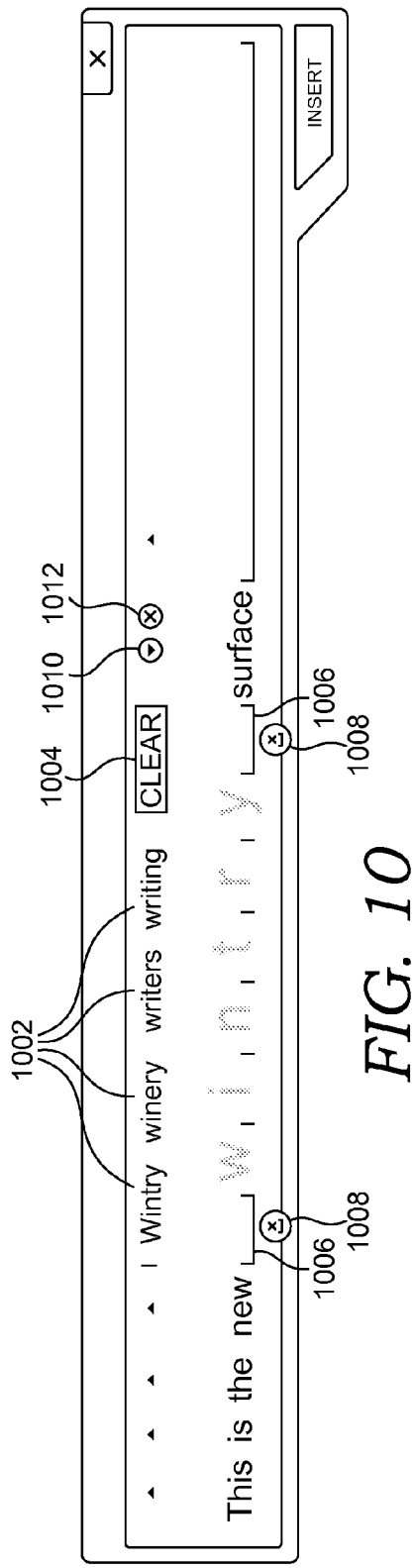
FIG. 10 is a screen display illustrating a word in character-mode in accordance with an embodiment of the present invention.

By way of illustration, FIG. 10 provides a screen display showing a writing area in which the user has selected the word "wintry," causing the word to be presented in character-mode. As depicted in FIG. 10, the display of the selected word is increased in size to allow the characters of the words to be displayed as individual boxes and to facilitate accepting a user's handwriting.

Figure 11:
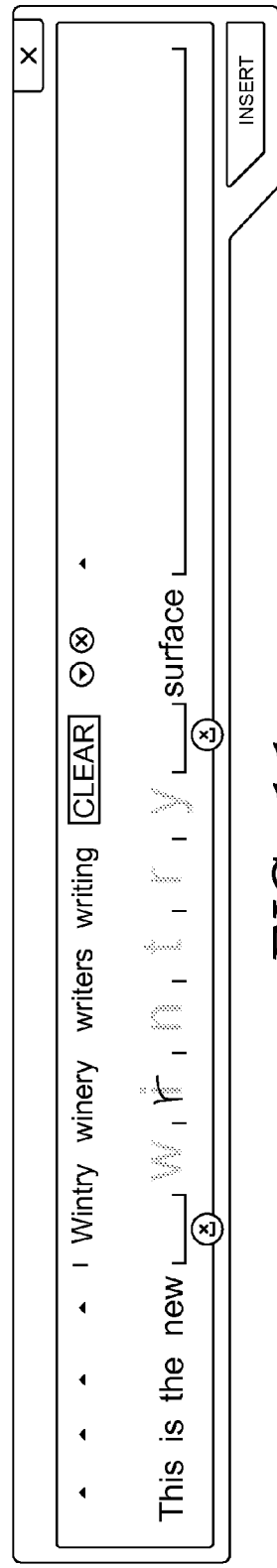
FIG. 11 is a screen display illustrating a user writing a handwritten character over a character of recognition text in character-mode in accordance with an embodiment of the present invention.

In character-mode, the user can overwrite characters directly. For instance, as illustrated in FIG. 11, the user has overwritten the letter "i" with the letter "r." The digital ink for the new character is recognized, and the overwritten character is replaced with the newly recognized character. In an embodiment, the characters of the text in character-mode may be displayed differently from non-selected text (e.g., displaying the characters in light grey or a different color) to indicate that the user can overwrite the characters directly. A user may also perform a scratch-out gesture on one or more characters within the character-mode user interface. A scratch-out gesture intersecting a predetermined portion (e.g., 80% or more) of a character box clears the box. Multiple characters can also be cleared with one stroke if the stroke intersects at least a predetermined portion (e.g., 50% or more) of a character box.

Referring again to FIG. 10, a number of recognition alternates 1002 may be provided for the selected word. For instance, in the present example, the alternates 1002 include, "Wintry," "winery," "writers," and "writing." If the user selects one of the recognition alternates, the word will be replaced with the selected alternate. In some embodiments, the character-mode user interface will be also be closed in response to the selection (returning to word-mode). The character-mode user interface may also include a clear button 1004. If the user selects the clear button 1004, the word will be deleted, and in some embodiments, the character-mode user interface will be closed.

Spaces 1006 may be presented on either side of the selected word in character-mode. In some embodiments, a delete space button 1008 may be presented with each space 1006. If a user selects a delete space button 1008, the corresponding space 1006 is deleted and the word in character-mode is combined with the word on the corresponding side of the selected button 1008. For instance, if the user were to select the delete space button 1008 corresponding with the space 1006 to the right, the word "wintry" would be combined with the word "surface." In some embodiments, the combined word is presented in character-mode, while in other embodiments the word is presented in word-mode. The user can also prepend or append characters in an open space 1006 in front of or behind the word. After a character is written in an open space 1006, the character-mode user interface will grow to provide a new open space before or after the new character. For instance, in one embodiment, the character-mode user interface may grow one space to the left if the user prepends a character, and grow one space to the right if the user appends a character after the word. This approach would avoid all the characters from moving. If there isn't enough space to expand in the desired direction without adding scroll buttons (e.g., as described in further detail below), then the character-mode user interface may expand in the other direction.

Figure 12:
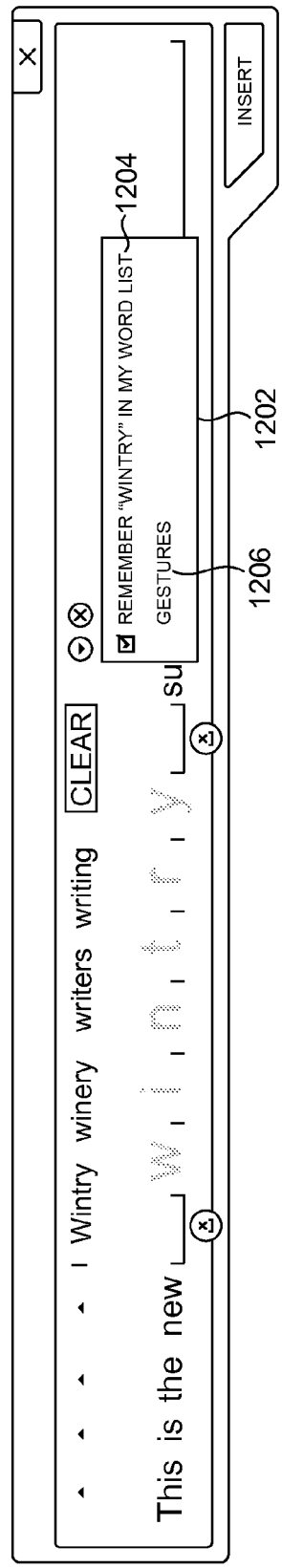
FIG. 12 is a screen display illustrating a menu to provide further features in character-mode in accordance with an embodiment of the present invention.

The character-mode user interface may also include a menu button 1010 to provide further features. An illustrative menu 1202 is provided in FIG. 12. In the present example, the menu includes an option 1204 to add the word shown in character-mode to or remove the word from a dictionary. If the word already exists in the dictionary, an option to remove it will be available. Selecting this option will remove the word from the dictionary and replace the menu item with an option to add the word to the dictionary. If the word wasn't in the dictionary initially, the behavior would be the opposite. The menu 1202 may also include an option 1206 to access gesture help and other training associated with the writing surface. In various embodiments of the invention, the menu 1202 may further include a variety of additional features not shown.

Figure 13:
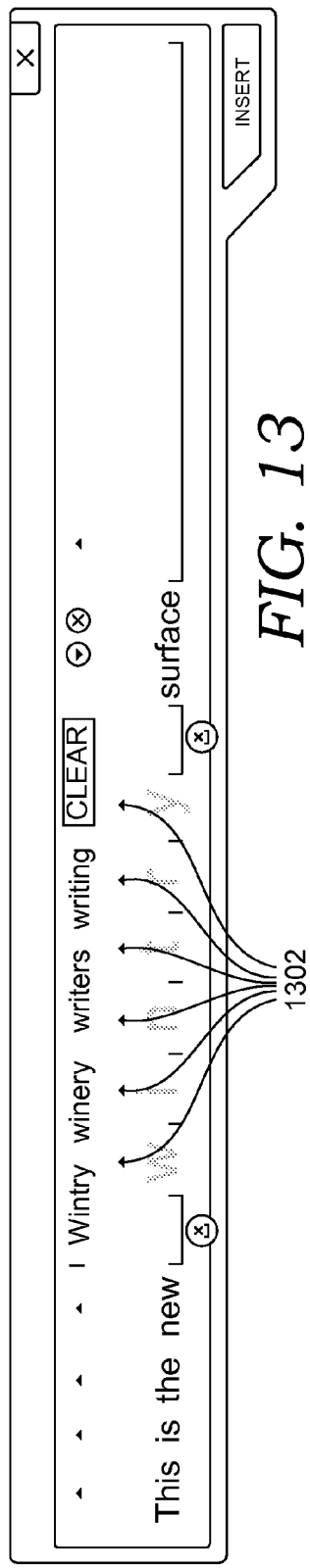
FIG. 13 is a screen display illustrating an expander button provided with characters to allow the user to access further single-character features for each character in accordance with an embodiment of the present invention.

In embodiments, the character-mode user interface also includes a number of single-character features to facilitate a user's editing/correction of the recognized word. In one embodiment, such as that shown in FIG. 13, an expander button 1302 may be provided with one or more characters to allow the user to access the further single-character features. On a device that supports hover, the expander button 1302 for each character may typically be hidden, and the expander button 1302 for a character is displayed when a user hovers the pen over the corresponding character box. In some embodiments (e.g., on a device that doesn't support hover), an expander button 1302 for each character may be continuously displayed with each character box while in character-mode.

Figure 14:
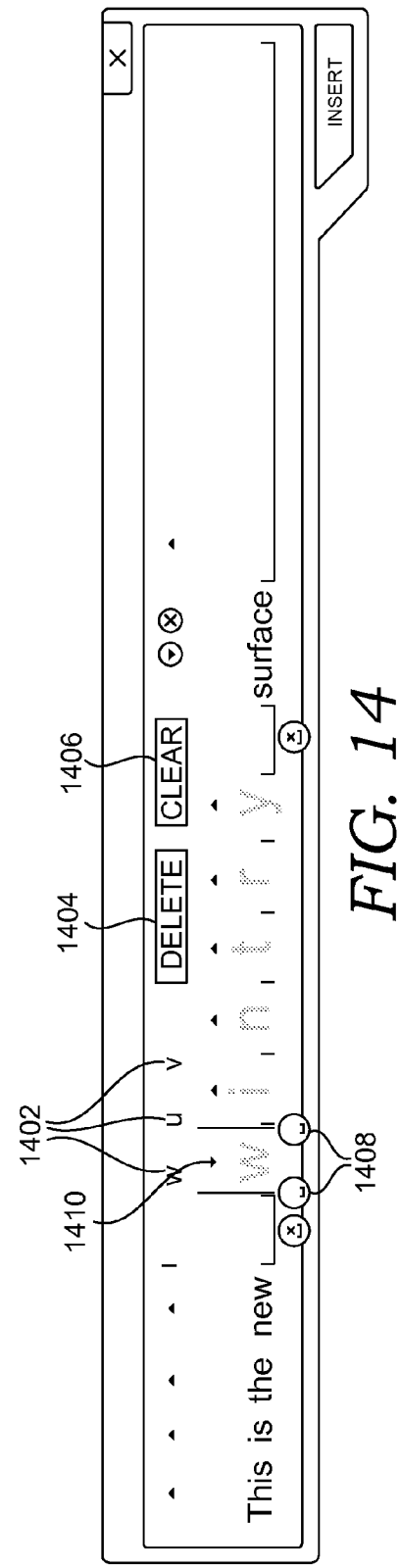
FIG. 14 is a screen display illustrating single-character features for a character selected in character-mode in accordance with an embodiment of the present invention.

When the user taps on the expander 1302 for one of the characters in character-mode, a variety of single-character features for that specific character are provided such that as shown in the screen display of FIG. 14. For instance, a number of alternate suggestions 1402 are provided for the corresponding character. In the present example, the letters "W," "v," and "u" are provided as alternate suggestions 1402. If the user selects an alternative, the character is replaced with the selected alternate. If the user selects a delete button 1404, the current character is removed, and in some embodiments, all the characters to the right are moved one step to the left. Selecting the clear button 1406 empties the content of the character box, leaving a space in which the user may write a character. The space icons 1408 allow a space to be added to the left or right of the selected character box. The space may be added according to the same rules as for the growing when prepending or appending characters by using empty characters boxes described above. In some embodiments, the single-character features are no longer displayed in response to one of the above-noted user actions. The single-character features for the current character may also be removed by the user selecting the upside-down expander icon 1410 for the current character, by the user switching directly to another character, or by another action in the character-mode (for example overwriting another character). When the single-character features get closed, the character-mode menu for the whole word will reappear.

Selecting any of the other word boxes will switch to showing character-mode for the newly selected word instead. For instance, if the user were to select the word "surface," the word "wintry" would no longer be shown in the character-mode user interface, and the word "surface" would now be shown in the character-mode user interface. A user may exit character-mode and return to word-mode in a number of different ways within various embodiments of the invention. For instance, the user may exit character-mode by selecting an exit character-mode button 1012 in FIG. 10. Additionally, the user may exit character-mode by simply starting to write at the baseline, tapping once at the baseline (without adding ink), or tapping at another location. Further, in some embodiments, character-mode may automatically be closed based on some other user action such as selecting a word alternate.

In some embodiments of the present invention, the system may provide real-time suggested changes for a word based on a user's handwritten editing while in character-mode. This allows a user to quickly correct a misrecognized word with very few character corrections. When the user makes character corrections, the digital ink will be re-recognized with the constraint(s) provided by the user's correction(s). When a new top alternate is available, it may be used to automatically replace the old word. In some cases (e.g., when an active digitizer is employed), the re-recognition and replacement may be triggered when the cursor moves out of the character box, the pen moves out screen range, or an overall timer is passed. In other cases (e.g., when a touch digitizer is employed), re-recognition and replacement may be performed after each ink stroke (on every pen up).

Figure 15A:
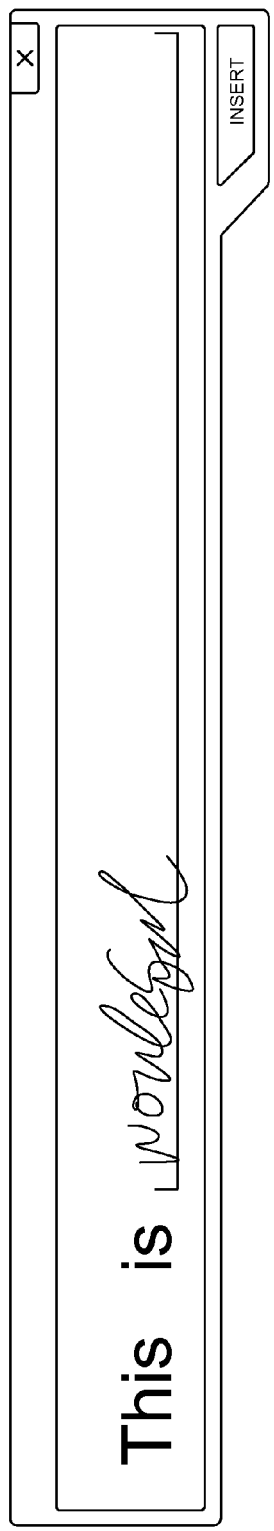
FIGS. 15A-15D are screen displays illustrating an automatic word correction based on a user's editing in character-mode in accordance with an embodiment of the present invention.
Figure 15B:
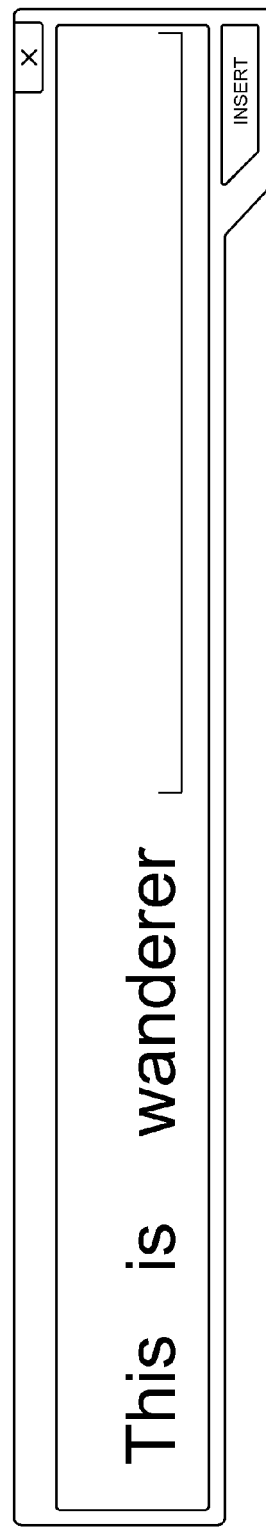
Figure 15C:
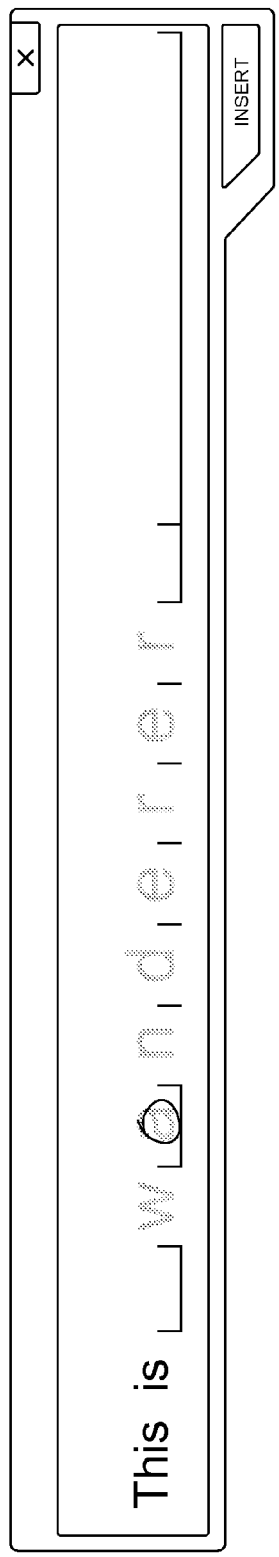
Figure 15D:
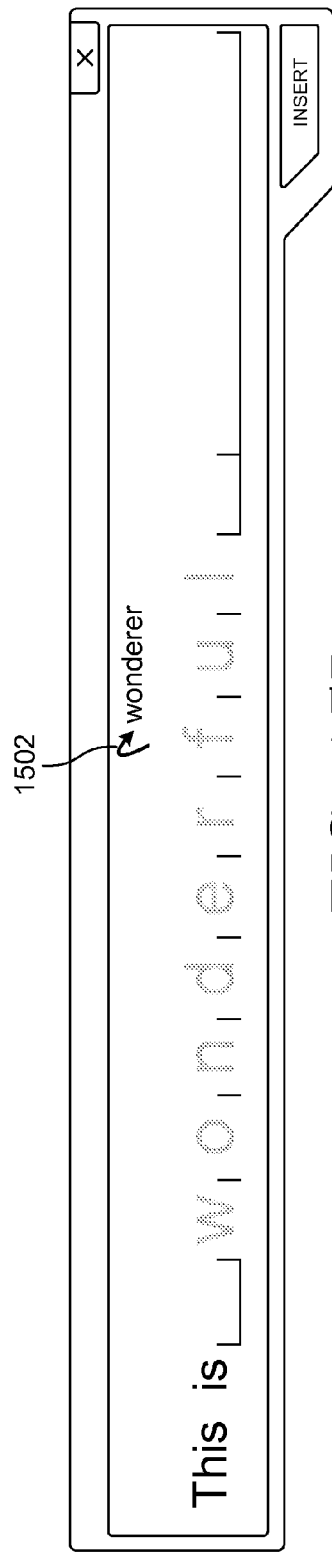

FIGS. 15A through 15D illustrate an automatic word replacement based on a handwritten correction in accordance with an embodiment of the present invention. Referring initially to FIG. 15A, a user is writing "This is wonderful." The words "This" and "is" have already been converted to text, and the user is writing the word "wonderful." As shown in FIG. 15B, the recognizer misrecognizes the user's handwriting for the word "wonderful" as "wanderer." Recognizing that the word has been misrecognized, the user may select the word "wanderer," causing the word to be displayed in character-mode as shown in FIG. 15C. As shown in FIG. 15C, the user overwrites the character "a" with the character "o." The recognizer uses this information to constrain the recognition of the ink. By doing so, the recognizer determines that the word "wonderful" is a top alternate. As shown in FIG. 15D, the rest of the word is automatically updated to provide the best suggestion of what the user tried to write with the constraint of an "o" as the second character.

In an embodiment, the automatic word correction assumes that the user starts a correction from the left to the right. Accordingly, everything to the left of the rightmost corrected character is assumed to be accepted as correct by the user, and will be fixed when an updated recognition suggestion is provided.

In some cases, the replacement word provided by the automatic word correction may differ from what the user intended. Accordingly, in an embodiment, a revert entry option may be provided in the correction user interface. If a user selects the revert entry option, the text is reverted to the text that would have been in the correction area if the automatic word correction was not applied. For instance, with reference to FIGS. 15C and 15D, after the automatic word correction has been applied, a revert entry option 1502 is provided with an indication of the word that would have resulted after the user's edit had the automatic word correction not been applied. In the present example, the word "wonderer" is indicated with the revert entry option 1502, reflecting the user's change of the character "a" in "wanderer" to an "o" shown in FIG. 15C. If the user were to select the revert entry option 1502, the word "wonderful" would be replaced with the word "wonderer" in the correction user interface.

Transitioning from Word-Mode to Character-Mode

In some embodiments, when transitioning from word-mode to character-mode, the selected word is displayed in character-mode using more space than in word-mode to provide a fuller user interface for the word to facilitate receiving handwriting input and other selections from the user to make corrections. To create space within the writing surface for the character-mode user interface, in an embodiment, the font size for the other text is reduced. In some embodiments of the invention, the font size of all other text may be reduced to a common size. Additionally, in some cases, the font may be made narrower as well as smaller to provide more space for the character-mode box. In some embodiments, the other words may be moved to provide space for the word in the correction user interface. In further embodiments, the word space (i.e., the space between words) may additionally or alternatively be reduced to provide space for word in character-mode. In still further embodiments, scroll bars may be used to allow text to no longer be displayed within the writing surface but may be accessed by a user by employing the scroll bars. Any and all such variations of providing space within a writing surface for the word in character-mode may be employed within the scope of embodiments of the present invention.

By way of example and not limitation, space may be provided for a selected word in character-mode as follows. Space is provided around the character-mode box by reducing the font-size and word spacing for the other text. In an embodiment, the resizing will be consistent for all other text, including text on both sides of the character-mode box, if applicable. The new font size is determined by how small size the text to the left of the character-mode box has to be reduced to provide space for the character-mode box. The character-mode box is center-aligned around the original location of the selected word if there is enough space on the left side. If reducing the surrounding text to a minimum font size doesn't provide enough space, the character-mode box is left-aligned as far as possible. The character-mode box is moved only so far to the right so that the left side is aligned with where the left edge of the corresponding word box was before it was selected. If there is not enough room to fit the text to the left of the character-mode box, even after the font size is set to the minimum, then as much as needed of this text is scrolled out of view to the left and a horizontal scroll button is provided. Text to the right of the character-mode box is moved to the right. If there isn't enough room on to move the text to the right, then the text may be moved out of view to the right and a horizontal scroll button will appear. In some cases, the text may be moved to the next line. When the user closes character-mode, the other text may be moved back to its original location and original sizing. In some embodiments, if enough room is not available to fit all the text on the line, the text may flow to the next line. If there's no line below, a new one may be added. If there isn't room to display another line under the current one, then the line may be added and a vertical scroll button may be provided for scrolling vertically.

Figure 16A:
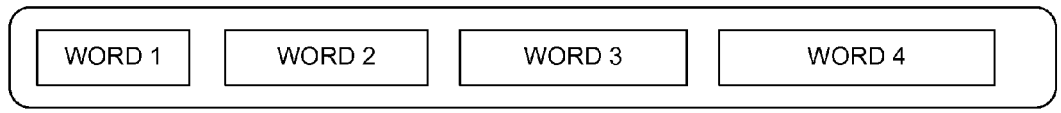
FIGS. 16A-16H are screen displays illustrating adjusting font size, word positions, word spacing, and use of scrolls to provide space for a word in character-mode in accordance with an embodiment of the present invention.
Figure 16B:
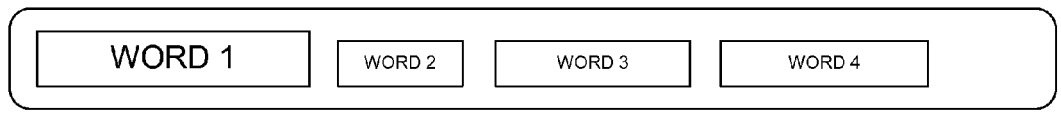

Referring to FIGS. 16A through 16G, examples of adjusting font size, word positions, word spacing, and use of scrolls are illustrated. Initially, FIG. 16A depicts four recognized words at their respective original sizes and locations while in word-mode. As shown in FIG. 16A, when a user selects "Word 1," the word is presented in character-mode. As seen in FIGS. 16A and 16B, the character-mode user interface for "Word 1" requires more space than that required by "Word 1" in word-mode. To provide space for this expansion, the other words, "Word 2," "Word 3," and "Word 4" are moved to the right and the font of these words is reduced.

Figure 16C:
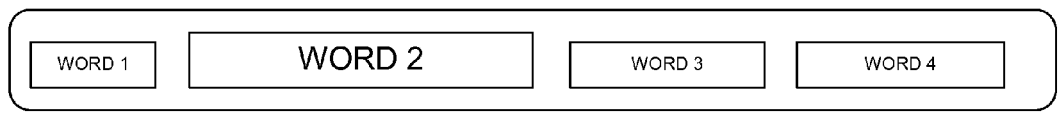

FIG. 16C illustrates a user selection of "Word 2," causing the word to be displayed in character-mode. As shown in FIG. 16C, the font size of the other words, "Word 1," "Word 3," and "Word 4" is reduced. There is not enough room on the left side of "Word 2" for the character-mode box to be completely center-aligned to the word's word-mode location. Accordingly, the character-mode box is left-aligned to "Word 1." Additionally, "Word 3" and "Word 4" are moved to the right to accommodate the space required for the character-mode box.

Figure 16D:
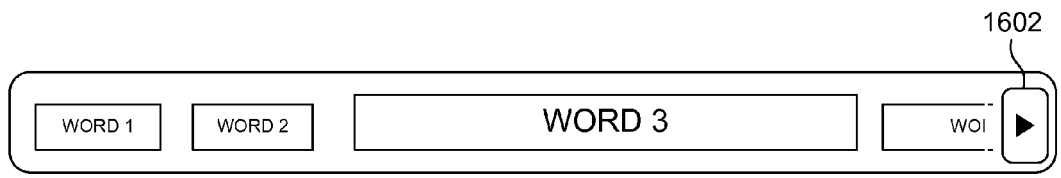
Figure 16E:
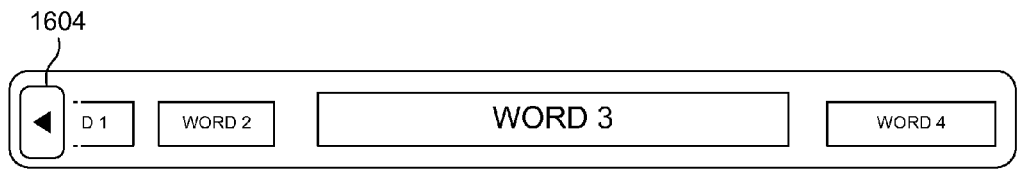

In FIG. 16D, the user has selected "Word 3," causing the word to be displayed in character-mode. In the illustrated embodiment of FIG. 16D, when "Word 3" is presented in character-mode, there no longer is sufficient space on the line for "Word 4" to be displayed even when the font size of the other words have been reduced. Accordingly, in the present embodiment, "Word 4" is shown as being partially out of view and a right horizontal scroll button 1602 is provided. If the user selects the right scroll button 1602, the text is scrolled, causing "Word 4" to come into view, "Word 1" to move partially out of view, and a left horizontal scroll button 1604 to be displayed, as shown in FIG. 16E.

Figure 16F:
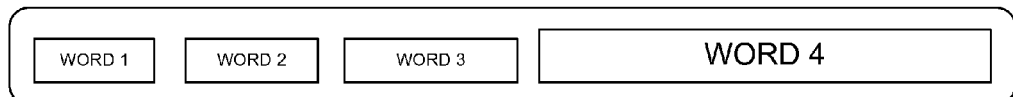
Figure 16G:
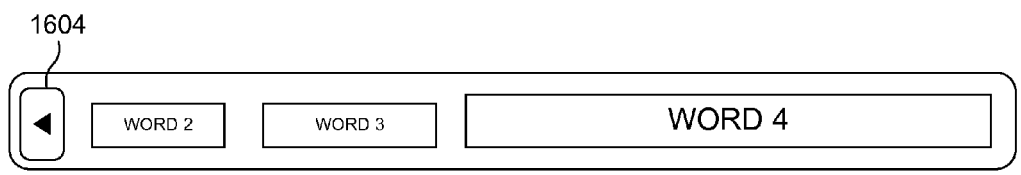

As shown in FIG. 16F, a user may select the last word (i.e., "Word 4") on the line. In one embodiment, if there is enough space available on the line, the character-mode box is center-aligned on the position of the text in word-mode. Otherwise, the character-mode box is left-aligned on the preceding word (i.e., "Word 3"). In some embodiments, such as that shown in FIG. 16G, there may not be enough room available when the last word is displayed in character-mode. In this example, "Word 1" is moved out of view and the left horizontal display button 1604 is presented.

Figure 16H:
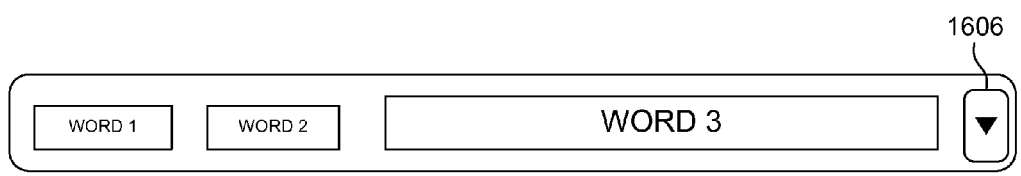

As noted previously, in some embodiments, words may be moved to a new line. In some cases, vertical scroll bars may be provided to scroll to lines that are not within the current view. For instance, in FIG. 16H, "Word 3" is shown in character-mode resulting in insufficient space being available on the current line for all the words. Accordingly, "Word" 4 has been moved to the next line, which is out of view, and a down vertical scroll button 1606 has been provided.

Exemplary Methods

Figures 17, 18:
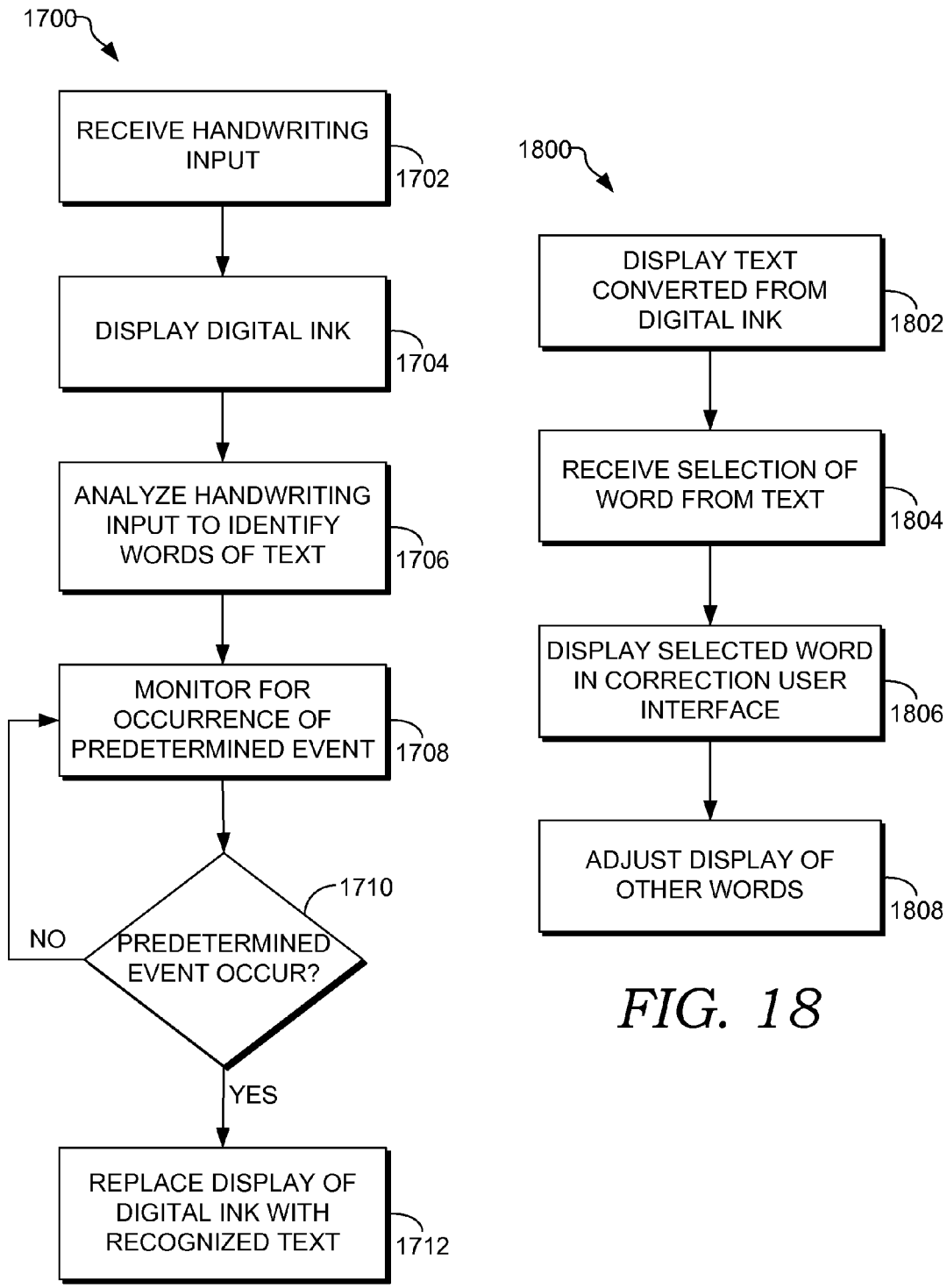
FIG. 17 is a flow diagram showing a method for automatically converting digital ink to recognized text in accordance with an embodiment of the present invention.
FIG. 18 is a flow diagram showing a method for displaying a selected word in a correction user interface in accordance with an embodiment of the present invention.

Turning to FIG. 17, a flow diagram is provided illustrating a method 1700 for automatically converting digital ink to text in accordance with an embodiment of the present invention. Initially, as shown at block 1702, handwriting input is received as a user writes using a handheld writing device, such as an electronic pen or stylus. Based on the handwriting input, digital ink is displayed, as shown at block 1704. In accordance with an embodiment of the present invention in which a digitizer is integrated with, overlays, or otherwise appended to a display device, the digital ink may appear on the display device corresponding with a location at which the user writes using the handheld writing device.

The handwriting input is sent to and analyzed by a recognizer, as shown at block 1706. The recognizer analyzes the handwriting input to identify one or more words of text corresponding with the handwriting input. Additionally, the systems monitors for the occurrence of one or more predetermined events that indicate the display of the digital ink should be replaced with the display of text from the recognizer, as shown at block 1708. As noted above, in an embodiment, the system attempts to convert the digital ink to text as the user finishes writing each word and/or begins writing another word. In one embodiment, the system monitors for the occurrence of predetermined events associated with three triggers: a distance-based trigger; a recognition-based trigger; and an overall timer-based trigger.

In accordance with the distance-based trigger, the digital ink is converted to text when the handheld writing device is moved a particular distance from the handwriting input. In an embodiment, the distance-based trigger includes both a short-distance trigger and a long-distance trigger. The short-distance trigger is used to trigger conversion when the handheld writing device is moved past a first distance for a predefined period of time. In an embodiment, the first distance and/or the predefined period of time associated with the short-distance trigger may be adapted based on a user's handwriting, for instance, by determining an average distance between words in the user's handwriting and/or determining an average time between writing words. The long-distance trigger is user to trigger conversion when the handheld writing device is moved past a second distance that is greater than the first distance associated with the short-distance trigger.

The recognition-based trigger is based on the recognition results from the recognizer. In particular, the recognition-based trigger may be time-based, in which if a word doesn't change in the recognition results for a predetermined period of time, the conversion from digital ink to text is triggered. In accordance with the overall timer-based trigger, the digital ink is converted to text when no handwriting input is received from the handheld writing device for a predetermined overall period of time.

As shown at block 1710, it is determined whether a predetermined event has occurred for triggering the automatic conversion of digital ink to text. If a predetermined event has not occurred, the system continues to monitor for the occurrence of a predetermined event as represented by the return to block 1708. Otherwise, if a predetermined event has occurred, the display of the digital ink is replaced with recognized text for the digital ink, as shown at block 1712. The text is displayed at a location corresponding with the location of the digital ink and inline with other text and/or other digital ink from further handwriting input as the user continues to write.

Referring now to FIG. 18, a flow diagram is provided illustrating a method 1800 for presenting a word of text in a correction user interface in accordance with an embodiment of the present invention. Initially, as shown at block 1802, at least two words of text are displayed that have been converted from digital ink corresponding with handwriting input. For instance, the text may have been converted from digital ink in a manner similar to that described above for the method 1700 with reference to FIG. 17.

A selection of a word of the text is received, as shown at block 1804. The word may be selected in a variety of different manners within various embodiments of the present invention. By way of example only and not limitation, the word be selected by a user tapping a handheld writing device, such as an electronic pen or stylus, on the word. In some cases, the word may be selected by tapping an icon, button, or other user interface widget associated with the word. Any and all such variations are contemplated to be within the scope of embodiments of the present invention.

In response to the selection, the word is displayed in a correction user interface, as shown at block 1806. The correction user interface provides an enlarged display of the word that replaces the original display of the word. Accordingly, the enlarged displaying of the word is inline with other words within the text. The correction user interface allows the user to edit the word on an individual character basis as well as provides other features and options for correcting the word. For instance, the correction user interface may provide alternate words for the selected word.

As shown at block 1808, the display of the other words within the text is adjusted to provide space for the enlarged display of the selected word in the correction user interface. In various embodiments of the present invention, the other words may be resized and/or moved to provide space for the correction user interface. In some embodiments, the spacing between the words may be reduced. In further embodiments, scroll bars may be provided if one or more words are moved outside of the display area. By employing the scroll bars, the user may bring those words back into view.

As can be understood, embodiments of the present invention provide for inline handwriting recognition and correction. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media devices embodying computer-useable instructions for performing a method comprising:
   receiving input corresponding with user handwriting from a handheld writing device;
   displaying digital ink representing the user handwriting based on the input;
   analyzing the input using a recognizer to identify one or more words as recognition text for the digital ink;
   employing at least three independent triggers to initiate conversion of display of the digital ink to display of the recognition text, wherein the at least three independent triggers include a distance-based trigger, a recognition-based trigger, and an overall timer-based trigger;
   determining that at least one of the at least three independent triggers has been satisfied, wherein satisfaction of any of the at least three independent triggers initiates conversion of display of the digital ink to display of the recognition text independent of satisfaction of the other independent triggers; and
   displaying the recognition text in place of the digital ink.

2. The one or more computer-storage media devices of claim 1, wherein the distance-based trigger includes a short-distance trigger and a longer-distance trigger, wherein the short-distance trigger is satisfied when the handheld writing device is moved past a first distance for more than a predefined period of time, and wherein the long-distance trigger is satisfied when the handheld writing device is moved past a second distance, the second distance being greater than the first distance.

3. The one or more computer-storage media devices of claim 2, wherein the first distance is based on an average spacing between words identified from previous user handwriting.

4. The one or more computer-storage media devices of claim 1, wherein displaying the recognition text in place of the digital ink comprises gradually fading out the digital ink as the recognition text is displayed.

5. The one or more computer-storage media devices of claim 1, wherein the method further comprises saving the digital ink after the recognition text has been displayed in place of the digital ink and using the digital ink with new digital ink for recognition purposes.

6. The one or more computer-storage media devices of claim 5, wherein the digital ink is no longer used for recognition purposes when recognition results for the digital ink have not changed for a predetermined period of time.

7. The one or more computer-storage media devices of claim 1, wherein the method further comprises:
   receiving additional input corresponding with additional user handwriting from the handheld writing device, wherein the additional input is received between two words of recognition text;
   expanding a space between the two words to provide space for receiving the additional user handwriting;
   displaying additional digital ink based on the additional input in the space between the two words;
   analyzing the additional input using the recognizer to identify one or more additional words as additional recognition text for the additional digital ink;
   employing the at least three triggers to determine when to convert display of the additional digital ink to display of the additional recognition text;
   determining that at least one of the at least three triggers has been satisfied indicating to convert display of the additional digital ink to the additional recognition text; and
   displaying the additional recognition text in place of the additional digital ink.

8. One or more computer-storage media devices embodying computer-useable instructions for performing a method comprising:
   displaying text including two or more words, the text having been previously converted from digital ink corresponding with handwriting input;
   receiving a user selection of a word within the text;
   responsive to the user selection, displaying the word in a correction user interface;
   displaying, within the correction user interface, an enlarged display of the word in place of an original display of the word in a manner in which the enlarged display of the word is inline with other words within the text, wherein a character-mode interface is displayed as part of the correction user interface allowing correction of the word on an individual character basis, wherein individual characters are separated within the correction user interface by visible markings; and
   adjusting the display of the other words within the text to provide space for displaying the correction user interface including the enlarged display of the word, wherein the correction user interface does not occlude the other words within the text.

9. The one or more computer-storage media devices of claim 8, wherein adjusting the display of the other words within the text comprises at least one of resizing at least one of the other words and moving at least one of the other words.

10. The one or more computer-storage media devices of claim 9, wherein adjusting the display of the other words further comprises providing at least one of a horizontal scroll bar and a vertical scroll bar.

11. The one or more computer-storage media devices of claim 8, wherein adjusting the display of the other words comprises reducing spacing between the other words.

12. The one or more computer-storage media devices of claim 8, wherein the method further comprises:
   receiving handwriting input at a location corresponding with a character of the word within the correction user interface;
   displaying digital ink corresponding with the handwriting input;
   analyzing the handwriting input using a recognizer to identify a new character corresponding with the digital ink; and
   replacing display of the character with the new character.

13. The one or more computer-storage media devices of claim 8, wherein displaying the correction user interface includes displaying one or more alternate words for the word, and wherein the method further comprises:
   receiving a user selection of one of the one or more alternate words; and
   replacing the word with the selected alternate word.

14. The one or more computer-storage media devices of claim 8, wherein the method further comprises:
   receiving a user selection of a character within the word; and
   presenting one or more single-character features for editing the selected character.

15. The one or more computer-storage media devices of claim 8, wherein the method further comprises:
   receiving handwriting input at a location corresponding with a character of the word within the correction user interface;
   displaying digital ink corresponding with the handwriting input;
   analyzing at least the handwriting input using a recognizer to identify an alternate word for the word; and
   automatically replacing display of the word with display of the alternate word.

16. One or more computer-storage media devices embodying computer-useable instructions for performing a method comprising:
   receiving handwriting input corresponding with a handheld writing device being moved relative to a display surface;
   displaying digital ink at a location on a display corresponding with a location of the display surface at which the handwriting input is received;
   analyzing the handwriting input using a recognizer to identify one or more words of text corresponding with the handwriting input;
   replacing display of the digital ink with the text as the user continues to provide additional handwriting input using the handheld writing device, wherein the text is displayed inline with additional digital ink corresponding with the additional handwriting input;
   receiving input to present a word of the text in a character correction interface, the character correction interface providing an enlarged display of the word in place of an original display of the word to facilitate receiving further handwriting input to correct the word, wherein the character correction interface allows correction of the word on an individual character basis, wherein individual characters are separated within the correction user interface by visible markings;
   displaying the word in the character correction interface by replacing the original display of the word with the enlarged display of the word; and adjusting display of other words within the text to provide space for the enlarged display of the word, wherein the correction user interface does not occlude the other words within the text.

17. The one or more computer-storage media devices of claim 16, wherein replacing the display of the digital ink with the text comprises:
monitoring for an occurrence of at least one predetermined event; and
upon detecting the occurrence of a predetermined event, displaying the text in place of the digital ink.

18. The one or more computer-storage media devices of claim 17, wherein monitoring for the occurrence of at least one predetermined event comprises:
monitoring for movement of the handheld writing device a predetermined distance from the location of the digital ink;
monitoring for stabilization of recognition results for the handwriting input for a predetermined period of time; and
monitoring for further handwriting input within a second predetermined period of time.

19. The one or more computer-storage media devices of claim 16, wherein the method further comprises:
receiving further handwriting input at a location corresponding with a character of the word within the character correction user interface;
displaying further digital ink corresponding with the further handwriting input;
analyzing at least the further handwriting input using a recognizer to identify an alternate word for the word; and
automatically replacing display of the word with display of the alternate word.

\* \* \* \* \*